Figure 5:
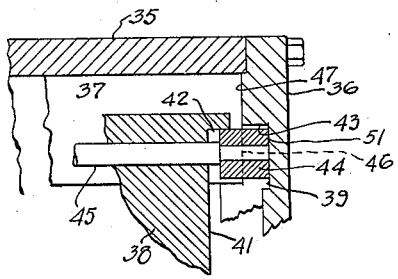

Oct. 26, 1948.  D. F. McGILL  2,452,253
FLOATING SEALING DEVICE
Filed Jan. 29, 1945  2 Sheets—Sheet 1
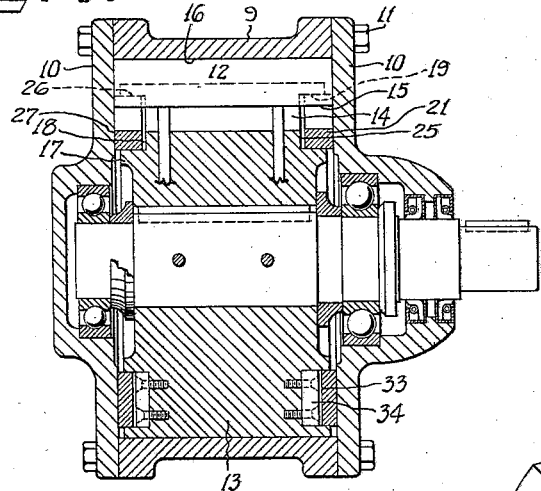
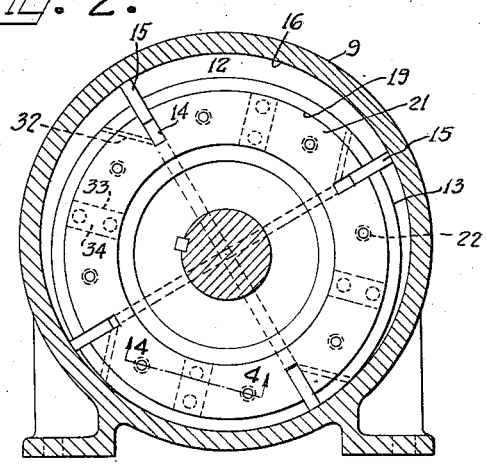
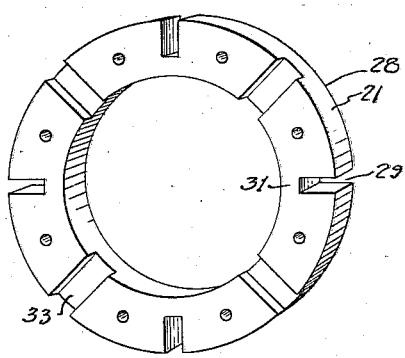
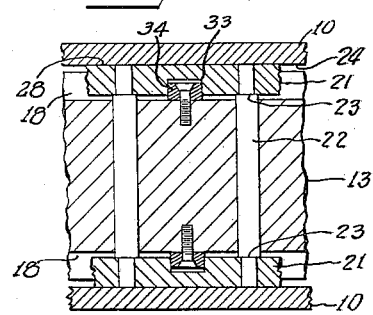

Oct. 26, 1948. D. F. McGILL 2,452,253
FLOATING SEALING DEVICE
Filed Jan. 29, 1945 2 Sheets-Sheet 2

INVENTOR
DANIEL F. McGILL
BY
ATTORNEY

Patented Oct. 26, 1948

2,452,253

UNITED STATES PATENT OFFICE 2,452,253

FLOATING SEALING DEVICE

Daniel F. McGill, Portland, Oreg.

Application January 29, 1945, Serial No. 575,001

10 Claims. (Cl. 103—202)

This invention relates to sealing devices for use between relatively rotating parts in apparatus such as rotary and centrifugal pumps, steam turbines, hydraulic power transmission mechanisms and the like, for sealing a high pressure area from a low pressure area.

The invention is illustrated and described herein as applied to rotary type pumps comprising a driven element rotatably mounted in a cylindrical casing and equipped with a plurality of radially extending blades forming a plurality of fluid chambers between the inlet and discharge sides of the pump. Each end face of the rotor is recessed to provide an annular shoulder extending axially from the end face of the rotor, and disposed between each end face of the rotor and the end wall of the casing is a sealing ring, a portion of the ring being received in the recess in the end face of the rotor and having sliding sealing engagement with the annular shoulder. The sealing rings are fastened together as by bolts or rivets extending through the rotor, the sealing unit comprising the sealing rings being of fixed over-all axial length and having running sealing engagement with the end walls of the housing. The openings through the rotor for the bolts or rivets are of sufficient size to permit free axial movement of the rotor in response to the end thrust created by adjustment of the shaft bearings or by operation of the driving means.

In rotary pumps embodying prior art constructions endwise movement of the shaft induced by operation of the driving means may cause the rotor to engage with one or the other of the end walls of the casing and have bearing contact therewith. When this occurs hydraulic pressure is exerted on the opposite side of the rotor, creating a friction load between the rotor and the casing in direct proportion to the pressure developed by the pump, and resulting in wear and subsequent leakage of the fluid between the rotor and the casing head.

It is, therefore, an object of the instant invention to provide a sealing unit disposed between a rotor and a stator in apparatus such as rotary type pumps and the like in which the rotor may be sufficiently shorter than the axial length of the rotor chamber as to avoid wearing contact between the rotor and the stator, thereby greatly increasing the efficiency of the unit and materially lessening its useful life.

It is a further object of the invention to provide in combination with a rotor and stator a sealing unit comprising a sealing ring disposed between the stator and each end face of the rotor, each said sealing ring having running sealing engagement with the stator and sliding sealing engagement with the rotor for sealing a high pressure area from a low pressure area.

It is a further object of the invention to provide in an apparatus comprising a rotor and a stator, and in which the axial length of the rotor is sufficiently less than the axial length of the stator as to preclude contact between the rotor and the end walls of the stator, a sealing unit comprising a sealing ring disposed between each end face of the rotor and the stator for sealing a high pressure area from a low pressure area.

It is a further object of the invention to provide in an apparatus comprising a rotor and a stator, and in which the axial length of the rotor is sufficiently less than the axial length of the stator as to preclude contact between the rotor and the end walls of the stator, a sealing unit comprising a sealing ring disposed between each end face of the rotor and the stator, each said sealing ring having running sealing engagement with the stator and sliding sealing engagement with the rotor and permitting endwise movement of the rotor in response to end thrust induced by adjustment of the shaft bearings or by operation of the driving means.

It is a further object of the invention to provide a novel sealing device for rotary type pumps and the like for greatly reducing the friction and hydraulic losses usually occurring in this type of equipment.

A further object of the invention is to provide a novel sealing device adapted for use between the rotor and the housing of rotary type pumps and the like which enables the use of a rotor of such axial dimensions as to be mounted entirely out of contact with the end walls of the pump housing.

The desired objects and advantages of the invention are obtained through the novel arrangement and unique construction and improved combination of the various parts hereinafter described and as illustrated on the accompanying drawings, it being understood that various changes in form, proportion, size and details of construction within the scope of the claims may be resorted to without departing from the spirit or sacrificing any of the advantages of the invention.

Figure 6:
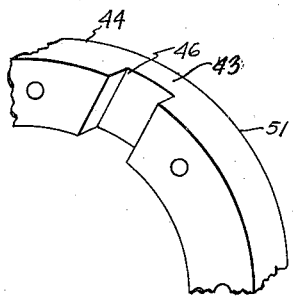
Figure 7:
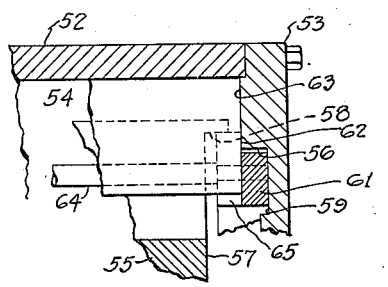
Figure 8:
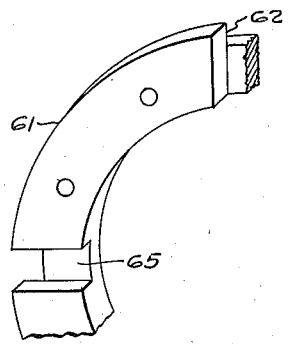
Figure 9:
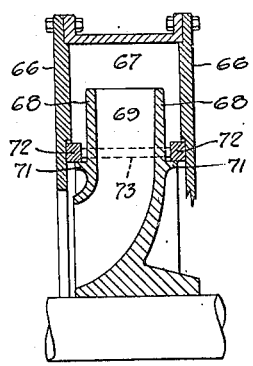
Figure 10:
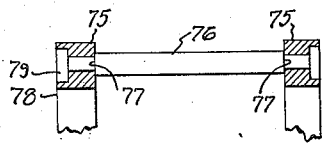

In the drawings: Figure 1 is a sectional elevation, in a plane parallel with the axis of the rotor, of a rotary pump employing a sealing device comprising an embodiment of the invention; Figure 2 is a sectional elevation of the rotary pump shown in Figure 1, taken in a plane perpendicular to the axis of the rotor; Figure 3 is a fragmentary perspective view of one of the sealing rings employed in the construction illustrated in Figures 1 and 2; Figure 4 is a fragmentary sectional view taken on the line 4—4 of Figure 2; Figure 5 is a fragmentary sectional elevation of a rotary pump illustrating a modification of the sealing device shown in Figure 1; Figure 6 is a fragmentary perspective view of one of the sealing rings employed in the construction illustrated in Figure 5; Figure 7 is a fragmentary sectional elevation of a rotary pump illustrating a further modification of a sealing device embodying the invention; Figure 8 is a fragmentary perspective view of one of the sealing rings employed in the construction shown in Figure 7; Figure 9 is a fragmentary sectional view of a centrifugal pump showing an adaptation of the sealing device illustrated in Figure 1; and Figure 10 is a sectional view of a sealing unit in which each sealing ring embodies a plurality of sealing faces.

The drawings illustrate the invention as being applied to a rotary pump comprising a casing 9 of generally cylindrical form and closed at its opposite ends by casing heads 10 secured to the casing 9 as by bolts 11 or similar fastening means. The casing 9 defines a rotor chamber 12 within which is mounted a rotor 13 having a plurality of equally spaced radially extending slots 14 within which are mounted rotor blades 15 having close running tolerance along their side edges with the inner faces of the casing heads 10 and engaging the cylindrically formed inner wall surface 16 of the casing which defines the rotor chamber. The casing heads 10 may or may not be provided with suitably packed glands as desired. The casing 9 is provided with oppositely disposed inlet and discharge ports, respectively, between which the rotor blades 15 are correlated with the arcuate wall 16 of the rotor chamber 12 to form buckets which receive fluid entering the pump at the intake port and from which the fluid is discharged at the discharge port.

In the construction illustrated in Figure 1 each end face 17 of the rotor 13 is provided with an annular recess 18, at least the outer side wall 19 of the recess being carefully machined so as to provide a close sliding fit with a sealing ring 21 mounted between each end face of the rotor 13 and the casing head 10. It will be noted that the axial length of the rotor 13 is less than the axial length of the rotor chamber 12, so that each end face 17 of the rotor 13 is spaced from the inner face of the casing head 10. Disposed between each end face 17 of the rotor 13 and the adjacent casing head 10 is a sealing ring 21, a portion of the ring being received in the annular recess 18 in the end face of the rotor. The sealing rings 21—21 are fastened together as by bolts or pins 22, provided with shoulders 23 adjacent each end of the bolt or pin 22 to hold the sealing rings 21—21 in predetermined spaced apart relation. The bolts or pins 22 extend through the rotor 13, the opening therefor being of sufficient size to permit free axial movement of the rotor 13 in response to the end thrust created during adjustment of the shaft bearings or by operation of the driving means. The sealing rings 21—21 and bolts 22 form a rigid unit of fixed overall length such as to provide a close running tolerance with the end walls 24 of the rotor chamber. The sealing rings 21 are rotatably mounted within the rotor chamber, rotation thereof being effected by reason of their connection with the rotor 13 through the connecting bolts or pins 22.

Each sealing ring 21 is of such thickness that it extends only partly into the annular recess 18 in the end face of the rotor to allow for end movement of the rotor and still have sealing engagement with the outer wall 19 of the recess. The recess is of such depth that the rotor 13 may have axial movement in response to end thrust without the inner recessed wall 25 of the rotor 13 contacting the inner face of the sealing ring. The sealing rings 21—21 form with the rotor 13 a seal at the point of contact 26 between each sealing ring 21 and the outer wall 19 of the annular recess 18, and a seal at the point of contact 27 between the end face 28 of each sealing ring and the casing head, for preventing the loss of fluid from the pump.

In prior art constructions the end thrust induced by operation of the driving means may cause the rotor to engage with one or the other of the casing heads and have bearing contact therewith, thereby causing the hydraulic pressure developed by the pump to be exerted on the opposite side of the rotor. This condition creates a friction load between the rotor and the casing in direct proportion to the pressure developed by the pump, and results in wear and subsequent leakage of the liquid between the rotor and the casing head. In a pump embodying the instant invention, by reason of the fact that the rotor may be greatly shortened relative to the axial length of the rotor chamber, the rotor 13 cannot engage the casing heads 10, being held out of engagement therewith by adjustment of the shaft bearings.

As illustrated in Figure 3, the sealing rings 21 are provided with radial slots 29 within which are mounted the respective end portions of the rotor blades 15, the sealing rings 21, however, being of sufficient radial width as to have an unslotted portion 31 which serves to hold the several segments of the sealing ring in integral relation.

In the construction illustrated in Figures 1 and 2, holes 32 drilled in the rotor 13 extend from the bottom of the radial slots 14 to the pressure side of the rotor blades 15 for admitting fluid under pressure to the slot 14 for urging the blades into engagement with the arcuate wall 16 of the rotor chamber. Since the slots 14 communicate with the annular recesses 18, and since the annular recesses are of greater depth than is occupied by the sealing ring 21, fluid under pressure from the chambers between adjacent rotor blades would be likely to flow along the channels formed by the annular recesses 18 from a high pressure area to a low pressure area. To prevent such flow from occurring, which, obviously, would impair the efficiency of the pump, a plurality of radial slots 33 are provided in the inner faces of the sealing rings 21, one slot being provided between each adjacent two of the rotor blades, as shown in Figure 4. Secured to each end face of the rotor 13 and extending into each one of the slots 33 is a radially disposed rib 34 so mounted on the end face of the rotor as to provide sealing engagement with at least one side wall of the slot 33 in the sealing ring. By this means, the channels formed by the annular recesses 18 in the end faces of the rotor are effectively sealed at a point between each adjacent two of the rotor blades and the flow of fluid from the pressure chambers of the pump to a low pressure area is prevented.

In Figure 5 is shown a rotary pump comprising a casing 35 and casing head 36 defining a rotor chamber 37 within which is mounted a rotor 38. In this construction the casing head 36 is provided with an annular recess 39 in its inner face, and each end face 41 of the rotor 38 is recessed to provide an annular shoulder 42 substantially in axial alignment, though not necessarily so, with the annual shoulder 43 of the recess 39 in the casing head 36. A sealing ring 44 is disposed between each end face 41 of the rotor and the casing head 36, the sealing rings 44 being disposed on the opposite ends of pins 45 which fixedly hold the sealing rings in spaced apart relation so that the overall axial length of the interconnected sealing rings is such as to provide a running sealing engagement with the recessed faces 39 of the casing heads. The pins 45 connecting the sealing rings 44 extend through the rotor 38 so that the sealing rings 44 are caused to rotate therewith.

Each sealing ring 44 is of sufficient thickness in the axial direction to extend into the recess 39 in the casing head and to project under the annular shoulder 42 on the end face of the rotor for forming a seal against the passage of fluid therebetween. Axial movement of the rotor, such as may take place in response to the end thrust induced by operation of the driving means or adjustment of the shaft bearings, causes a relative movement between the sealing ring and the rotor, the annular shoulder on the end face of the rotor having sliding engagement with the peripheral face of the sealing ring.

As shown in Figure 6, each sealing ring 44 is provided with radially extending slots 46 to receive the rotor blades therein, the bottom of each slot 46 being in the plane of the innermost surface 47 of the casing head, the unslotted portion 49 of the ring extending into the recess 39 in the casing head and forming a seal at the point of contact between the end face 51 of the sealing ring and the casing head.

A slightly different structure is illustrated in Figure 7 in which is shown a casing 52 provided with casing heads 53 defining a rotor chamber 54 in which is mounted a rotor 55. The casing heads 53 are recessed to provide annular shoulders 56, and the end faces of the rotor 55 are similarly recessed to provide annular shoulders 58. The recesses 59 in the casing heads 53 are of smaller diameter than are the recesses in the end faces 57 of the rotor 55 whereby the annular shoulders 58 are offset in the radial direction from the shoulders 56. The construction illustrated comprises sealing rings 61 disposed between the rotor 55 and the casing heads, each sealing ring extending into a recess 57 in the end face of the rotor 55 and having sealing engagement with the annular shoulder 58. A portion of each sealing ring extends into the recess 59 in the casing head, the overall axial length of the sealing unit, however, being less than the distance between the recessed faces of the casing heads so that each sealing ring is loosely fitted between the recessed end face of the rotor and the recessed wall of the casing head.

The sealing rings 61 are rabbeted to provide shoulders 62 overlying the inner faces 63 of the casing heads 53 outwardly of the recesses 59. The sealing rings are mounted on the reduced end portions of pins 64 which hold the sealing rings in predetermined spaced apart position with the shoulders 62 thereof in running engagement with the faces 63 of the casing heads for effecting a seal therebetween. As shown in Figure 8, each sealing ring is provided with radially extending slots 65, one for each of the rotor blades, the bottom of each slot being in the plane of the innermost surface 63 of the casing heads, the unslotted portion of each ring lying within the recess 59 in the casing head serving to hold the several segments of the sealing ring in integral relation.

In Figure 9 is illustrated a fragmentary portion of a pump casing having walls 66 defining a pump chamber 67 having mounted therein an impeller. The impeller comprises shroud plates 68—68 having impeller vanes 69 extending therebetween. Adjacent its discharge end the impeller is provided with outturned annular flanges 71 extending in the direction of the walls 66 of the pump casing. A sealing ring 72 is mounted between each shroud plate 68 and the adjacent casing wall 66, the two sealing rings 72—72 being interconnected by means of a bolt or pin 73 extending loosely through the impeller and holding the sealing rings fixedly in spaced apart predetermined relation so that the overall length of the sealing unit comprising the two sealing rings is such as to provide a running sealing engagement with the inner faces 74 of the casing walls. Each of the sealing rings 72 is held in sealing engagement with the outturned annular flange 71 on the impeller so as to form therewith a seal against the passage of fluid therebetween. The thickness of each sealing ring 72 is less than the distance between the impeller shroud and the adjacent wall of the pump casing, the annual flanges having sliding engagement with the sealing rings in the event of axial movement of the impeller.

In Figure 10 is illustrated a sealing unit comprising a pair of sealing rings 75—75 held fixedly in spaced apart predetermined relation by means of bolts or pins 76, only one of which is shown. The sealing rings are mounted on reduced end portions of the pins and bear against shoulders 77 on the pins which hold the rings in running engagement with the stator. The sealing faces 78 of the sealing rings are undercut or recessed as at 79 to provide a labyrinth type seal, as well as a contact seal, and to reduce the bearing surface and frictional load on the rotor.

In each of the modifications described herein, the sealing rings are so interconnected as to have a fixed overall length providing for close running engagement with the pump housing for effecting a seal therebetween. In each modification, also, the seal between each sealing ring and the rotor is just free enough to allow for relative axial movement of the sealing unit and the rotor. By reason of the fact that the connecting pins extend through the rotor the sealing rings rotate with the rotor, the only relative movement therebetween being in the axial direction, as may be caused by adjustment of the shaft bearings or operation of the driving means. Because there is equal opportunity for fluid to enter between each ring and the casing head, the sealing unit is hydraulically balanced and not subject to end thrust. Thus the sealing rings may be said to "float" between the casing heads, the fluid from the pump chambers tending to lubricate the seal so that very little friction is developed between the sealing rings and the casing heads.

Having now described my invention and in what manner the same may be used, what I claim as new and desire to protect by Letters Patent is:

1. A sealing device comprising in combination a stator, a rotor, and a sealing unit, said sealing unit comprising a pair of sealing rings disposed between adjacent portions of the stator and rotor on opposite ends of said rotor, and means interconnecting said sealing rings for maintaining them in sealing engagement with said stator, said sealing rings being caused to rotate with said rotor and having sliding engagement with said rotor and forming therewith a seal whereby said rotor may have axial movement relative to said stator and said sealing unit.

2. A sealing device comprising in combination a stator, a rotor and a sealing unit, said sealing unit comprising sealing rings disposed between each end face of said rotor and the stator, a plurality of openings extending axially through said rotor, a plurality of pins disposed in said openings and interconnecting said sealing rings for holding said sealing rings in sealing engagement with said stator, said pins slidably engaging said rotor for permitting axial movement of the rotor relative to said sealing unit, said sealing rings slidably engaging said rotor and forming therewith a seal while permitting free rotation of said rotor within said stator.

3. A sealing device comprising in combination a stator, a rotor and a sealing unit, said sealing unit comprising a pair of sealing rings mounted one between each side of said rotor and the stator, a plurality of pins interconnecting said sealing rings, said pins having reduced end portions forming shoulders against which said sealing rings are seated for holding said sealing rings in predetermined spaced apart relation and in close running engagement with said stator but separated from said rotor, said pins being carried by said rotor whereby said sealing rings are caused to rotate therewith, said sealing rings forming with said rotor and said stator a seal, said rotor slidably engaging each of said sealing rings whereby said rotor may have axial movement relative to said stator and said sealing unit.

4. A sealing device comprising in combination a stator and a rotor and a sealing unit, a recess in each end face of the rotor forming an annular shoulder, said sealing unit comprising a sealing ring disposed between each end face of said rotor and said stator and having sliding engagement with said shoulder, a plurality of pins extending through said rotor and engaging said rings for holding said rings in running engagement with said stator, the inner face of each said ring being spaced from said rotor for permitting axial movement of said rotor, said sealing rings forming with said stator and with said annular shoulder a seal.

5. A sealing device comprising in combination a stator, a rotor and a sealing unit, said sealing unit comprising a sealing ring disposed between each end face of the rotor and the stator, a plurality of openings extending axially through said rotor, a plurality of pins disposed in said openings and engaging said sealing rings for holding said sealing rings in predetermined spaced relation and having reduced end portions forming shoulders against which said sealing rings are seated so as to be held in close running engagement with the said stator, said pins slidably engaging said openings for permitting axial movement of said rotor, and means on said rotor slidably engaging said sealing rings and forming therewith a seal, each said sealing ring thereby forming between said rotor and said stator a seal.

6. A sealing device comprising in combination a stator, a rotor and a sealing unit, said rotor having an annular recess in each end face thereof and radial ribs extending transversely of said annular recess, said sealing unit comprising a sealing ring disposed between each end face of the rotor and the stator and being disposed partly within said recess, radially disposed slots in said sealing rings, said ribs engaging in said slots for preventing flow of fluid in said annular recess.

7. A sealing device comprising a stator, a rotor, and sealing rings, said rotor being provided with an annular recess forming an annular shoulder on each end thereof and having an axial length less than that of the rotor chamber so that each end face of the rotor is spaced from the corresponding inner face of said stator, said sealing rings being so disposed that they are in part received by the said annular recesses and have sliding engagement with the shoulders thereof, a plurality of pins extending axially through the rotor and having sliding engagement therewith, said pins having reduced end portions forming shoulders against which said sealing rings are seated so as to be held out of engagement with the end face of the rotor but in close running engagement with the said stator, thereby forming between the rotor and stator a seal, while at the same time permitting endwise movement of the said rotor without contact of the rotor with the end walls of the said stator.

8. A sealing device comprising a stator, a rotor and a sealing unit, an annular shoulder extending axially from each end face of said rotor, said sealing unit comprising a sealing ring being disposed between each end face of the rotor and the stator, means interconnecting said sealing rings for holding them in a predetermined spaced apart relationship such that the overall axial length of the interconnected sealing rings is sufficient to provide a running sealing engagement with said stator, each said sealing ring being of sufficient width to extend into sealing engagement with the shoulder on the rotor but of insufficient width to engage the end face of the rotor.

9. A sealing device comprising in combination a rotor, a housing, and a sealing unit, said sealing unit comprising sealing members disposed between adjacent portions of the rotor and housing and forming therewith a seal, means carried by said rotor and interconnecting said sealing members for holding said members in running sealing engagement with said housing, said means causing said members to rotate with said rotor and having free relative movement axially in said rotor.

10. A sealing device comprising in combination a stator and a rotor and a sealing unit, said sealing unit comprising a pair of sealing rings mounted one between each side of the rotor and the stator, means extending through said rotor for holding said sealing rings in close running engagement with said stator, each said sealing ring forming with said rotor and said stator a seal, said sealing unit and said rotor having free relative movement solely in the axial direction of said rotor, said sealing unit and said stator having only relative rotational movement.

DANIEL F. McGILL.

REFERENCES CITED

The following references are of record in the file of this patent:

UNITED STATES PATENTS

| Number | Name | Date |
|---|---|---|
| 1,716,901 | Rochford | June 11, 1929 |
| 1,996,875 | McCann | Apr. 9, 1935 |

FOREIGN PATENTS

| Number | Country | Date |
|---|---|---|
| 564,319 | France | 1923 |